US007751967B2

(12) United States Patent
Grai et al.

(10) Patent No.: US 7,751,967 B2
(45) Date of Patent: Jul. 6, 2010

(54) CONTROL SYSTEMS AND METHODS ASSOCIATED THEREWITH

(75) Inventors: Tim Grai, Oxford, MI (US); Chris Wunderlich, Canton, MI (US)

(73) Assignee: Infineon Technologies AG, Munich (DE)

( * ) Notice: Subject to any disclaimer, the term of this patent is extended or adjusted under 35 U.S.C. 154(b) by 623 days.

(21) Appl. No.: 11/402,764

(22) Filed: Apr. 12, 2006

(65) Prior Publication Data

US 2007/0244623 A1 Oct. 18, 2007

(51) Int. Cl.
*G06F 19/00* (2006.01)
*G06G 7/70* (2006.01)

(52) U.S. Cl. .......................... 701/115; 701/99; 701/102

(58) Field of Classification Search ................. 123/501, 123/674, 339.17; 701/115, 99, 102
See application file for complete search history.

(56) References Cited

U.S. PATENT DOCUMENTS 4,389,997 A * 6/1983 Nakano et al. .............. 123/492
4,590,565 A * 5/1986 Takasu et al. ............... 701/111
4,951,634 A * 8/1990 Nishizawa et al. .......... 123/492
5,230,316 A * 7/1993 Ichihara et al. ........ 123/406.38
5,276,625 A * 1/1994 Nakaniwa ................... 701/111
5,590,630 A * 1/1997 Kurihara et al. ........ 123/339.17
5,908,463 A * 6/1999 Akazaki et al. ............. 701/104
6,161,530 A * 12/2000 Kakizaki et al. ............ 123/674

OTHER PUBLICATIONS

"How Car Engines Work", Marshall Brain, reprinted from the Internet at: http://auto.howstuffworks.com/engine.htm/printable.
"How Camshafts Work", Karim Nice, reprinted from the Internet at: http://auto.howstuffowrks.com/camshaft.htm/printable.

* cited by examiner

*Primary Examiner*—Stephen K Cronin
*Assistant Examiner*—J. Page Hufty
(74) *Attorney, Agent, or Firm*—Eschweiler & Associates, LLC

(57) ABSTRACT

One embodiment of the invention includes a method for managing a system. The method includes providing a plurality of system values and generating an event signal if one of the plurality of system values is logically related to a compare value. At least two of the plurality of system values are captured at a time that is related to the event signal. Other systems and methods are also disclosed.

4 Claims, 8 Drawing Sheets

CONTROL SYSTEMS AND METHODS ASSOCIATED THEREWITH

FIELD OF THE INVENTION

The present invention relates to control systems, and more particularly to methods and systems for capturing control values.

BACKGROUND OF THE INVENTION

As an example of a control system application, many modern cars use a four-stroke combustion cycle to convert gasoline into motion. FIG. 1 illustrates the four strokes of a four-stroke engine, namely: intake stroke 10, compression stroke 12, combustion stroke 14, and exhaust stroke 16. FIG. 1 also illustrates aspects of an engine that is capable of implementing the four-stroke cycle. These illustrated aspects include a piston 18 that is connected to a crankshaft 20 by a connecting rod 22.

In implementing the four-stroke cycle, the piston 18 may move within a cylinder 24 as follows: During the intake stroke 10, the piston 18 starts at the top of the cylinder 24, an intake valve opens, and the piston 18 moves downward to let the engine take in a cylinder-full of air and fuel. Typical intake strokes 10 mix a small quantity of gasoline with air, thereby creating a fuel/air mixture. For the intake stroke 10 to work effectively, the intake valve should open at a particular point during the intake stroke 10.

During the compression stroke 12, the intake valve closes and the piston 18 moves upward to compress the fuel/air mixture. The compression stroke 12 makes an explosion during the ensuing combustion stroke 14 more powerful.

During the combustion stroke 14, the piston 18 reaches the top of its stroke, and a spark plug emits a spark to ignite the fuel/air mixture. The fuel/air mixture in the cylinder 24 explodes and drives the piston 18 down. In order for the combustion stroke 14 to work effectively, the spark plug should emit the spark at a particular point during the combustion stroke 14.

Lastly, during the exhaust stroke 16, the piston 18 hits approximately the bottom of the cylinder 24, an exhaust valve opens, and the piston 18 moves upward. In moving upward, the piston 18 pushes the exhaust out of the cylinder 24 and the exhaust exits through the exhaust system. At this point, the engine is ready for the next cycle, so it begins another intake stroke 10. In order for the exhaust stroke 16 to work effectively, the exhaust valve should open at a particular point during the exhaust stroke 16.

Thus, as one can see, the four-stroke cycle can be characterized by a piston 18 that moves in a linear fashion. As noted above, various events (e.g., an intake valve opening or closing, a spark plug emitting a spark, an exhaust valve opening or closing) should occur at particular points in time in the four-stroke cycle. In short, each piston 18 of an engine drives the rotational motion of the crankshaft 20, which in turn provides power to drive a vehicle. Thus, to provide for adequate operating efficiency, a four-stoke engine would benefit from a control system that accurately monitors and/or controls aspects of an operating engine.

In like fashions, control systems in other applications should adequately monitor and/or control various aspects of the apparatus or process being controlled.

SUMMARY OF THE INVENTION

One embodiment of the invention includes a method for managing a system. The method includes providing a plurality of system values and generating an event signal if one of the plurality of system values is logically related to a compare value. At least two of the plurality of system values are captured at a time that is related to the event signal. Other systems and methods are also disclosed.

DETAILED DESCRIPTION OF THE INVENTION

The present invention will now be described with respect to the accompanying drawings in which like numbered elements represent like parts. The figures and the accompanying description of the figures are provided for illustrative purposes.

In various embodiments, the present invention relates to a control system. In one particular example, the control system relates to an engine control system that may be used with various types of engines, including but not limited to: four-stroke engine(s), diesel engine(s), gas turbine engine(s), HEMI engine(s), rotary engine(s), or two-stroke engine(s).

Figure 1:
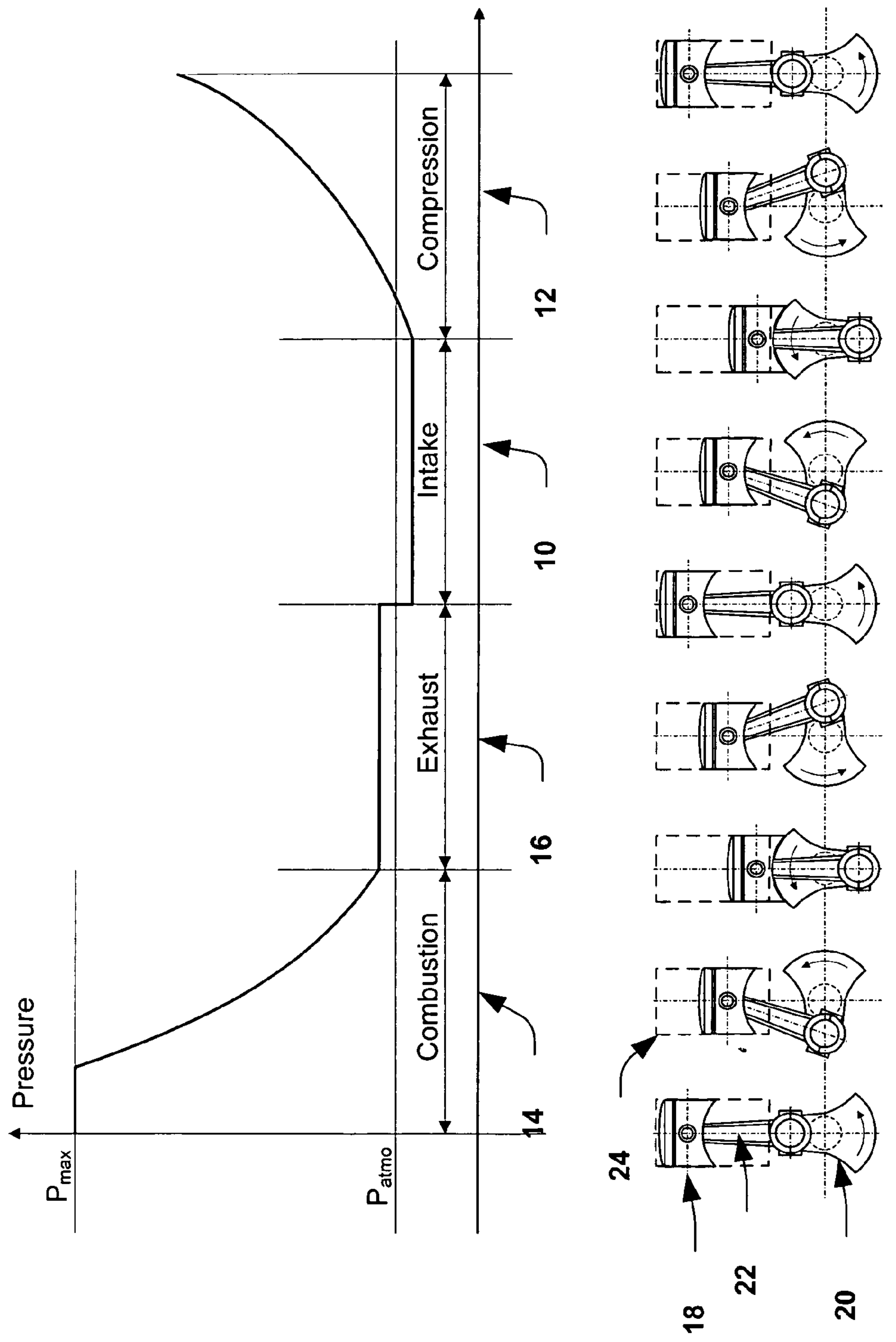
FIG. 1 is a diagram illustrating four strokes of a four-stroke engine.
Figure 2:
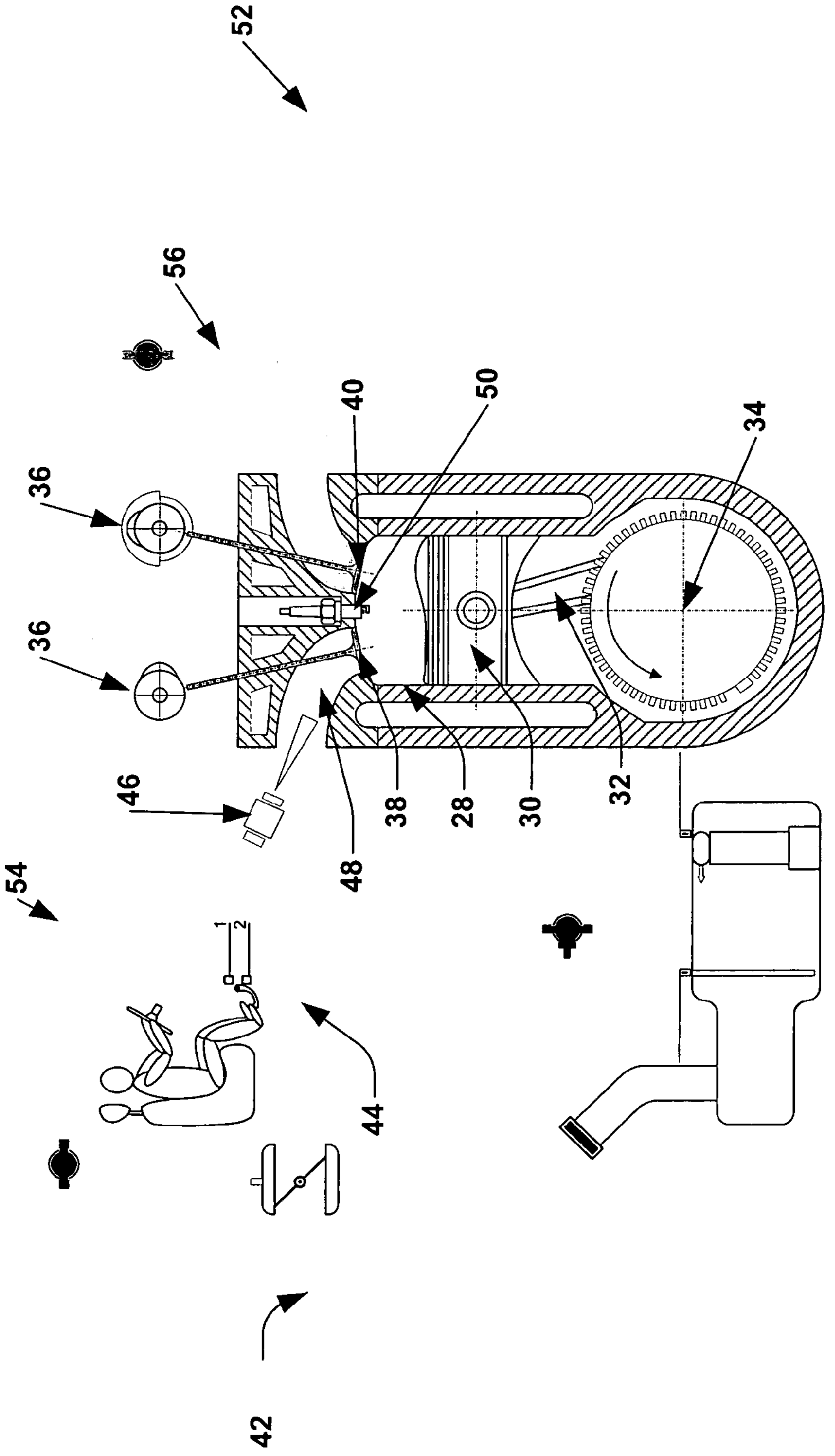
FIG. 2 illustrates one embodiment of an engine that may incorporate a control system.

Referring now to FIG. 2, one can see an embodiment that includes aspects of one engine 26. In one embodiment, the engine can include a number of cylinders 28, a number of pistons 30, a number of connecting rods 32, a crankshaft 34, dual overhead camshafts 36, intake valves 38, and exhaust valves 40. In general, inbound air 42 enters the engine via the intake region 44. As this inbound air 42 nears the cylinder 28, a fuel injector 46 injects fuel into the inbound-air, thereby creating the fuel/air mixture 48. An intake valve 38 opens, and the fuel/air mixture 48 enters the cylinder 28. The intake valve 38 then closes, the piston 30 compresses the fuel/air mixture 48, and the spark plug 50 emits a spark. The ensuing explosion drives the piston 30 downward and the exhaust valve 40 opens, thereby releasing exhaust gases to the exhaust region 52. In the illustrated embodiment, auxiliary air 54 is directed to the exhaust region 52 to heat various catalysts. The exhausted gas 56 is reused for the input stream to reduce pollution. In various embodiments, the engine can operate efficiently at high speeds by accurately monitoring and/or controlling various engine events (e.g., spark plug 50 emitting a spark, intake valve 38 opening or closing, exhaust valve 40 opening or closing).

Figure 3:
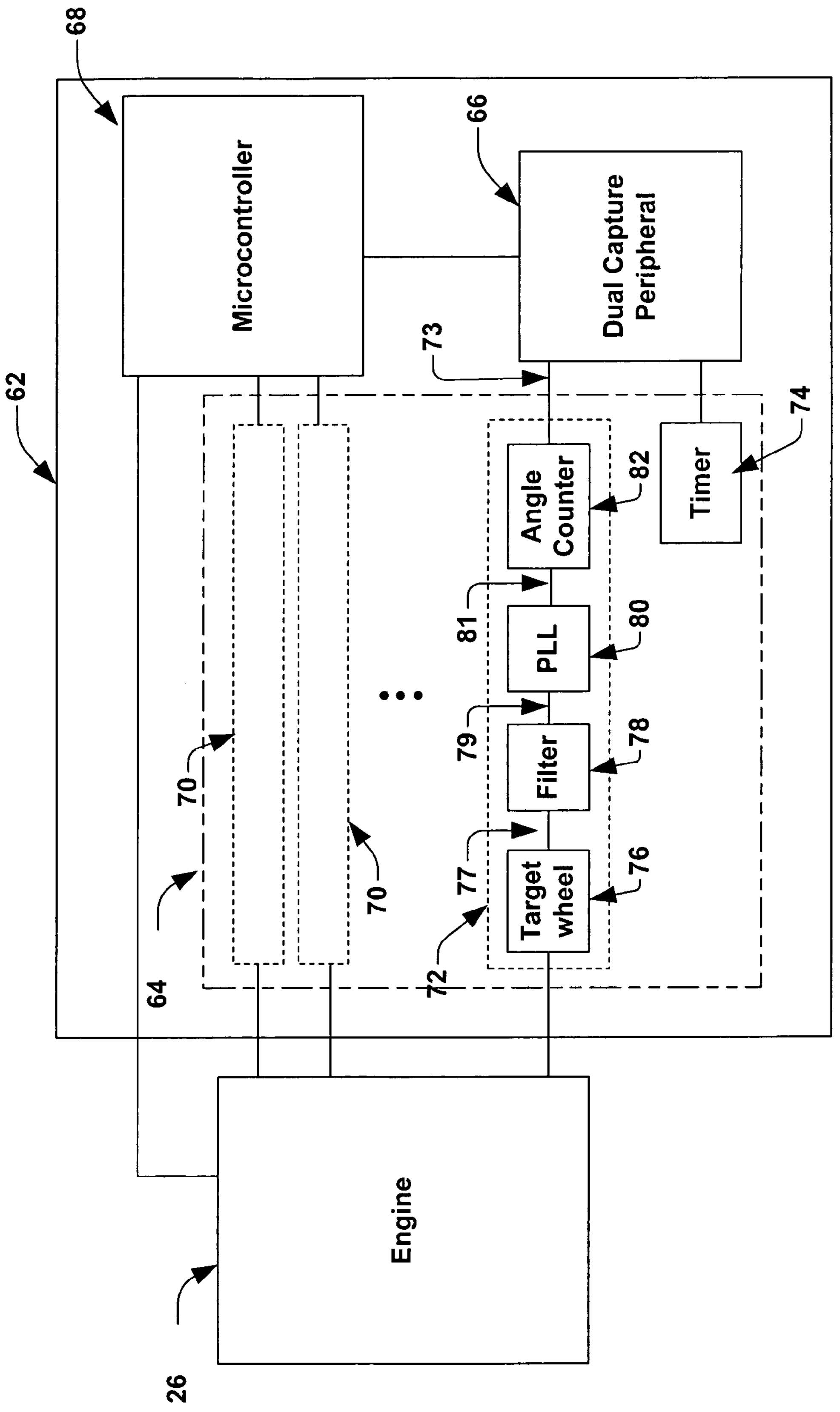
FIG. 3 is one embodiment of a block diagram illustrating a control system.

Referring now to the illustrated embodiment in FIG. 3, one can see that an engine 26 may be coupled to the engine control system 62. The illustrated engine control system 62 comprises: a block of engine sensors 64 for monitoring engine values, a dual capture peripheral 66 for storing at least two engine values on a single compare event, and a microcontroller 68. In short, the block of engine sensors 64 can monitor one or more engine values and the dual capture peripheral 66 can store at least two of these engine values. The microcontroller 68 then reads at least two of the engine values from the dual capture peripheral. Based on the engine values, the microcontroller 68 may provide a variety of control signals to the engine 26. In short, by providing a variety of control signals related to the engine values, the engine control system 62 may allow the engine 26 to operate more efficiently.

In various embodiments, the term "microcontroller" includes, but is not limited to: microcontroller(s), microprocessor(s), FPGA(s), PLA(s), ASIC(s), or DSP(s). In various embodiments, each of the terms "control signal" and "control signals" includes, but is not limited to: ignition signal(s) that may relate to one or more spark plugs 50 emitting a spark; injection signal(s) that may relate to one or more fuel injectors 46 injecting fuel; valve control signal(s) that may relate to the opening and/or closing of various valves, including one or more intake valve(s) 38 and/or one or more exhaust valve(s) 40; system control signal(s); and/or component control signal (s).

The block of engine sensors 64 may include one or more sensors 70, each of which may be coupled to the engine 26 and each of which may monitor at least one engine value. In various embodiments, each of the terms "engine value" and "engine values" may relate to, but are not limited to: time information, angle information, speed information, acceleration information, position information, pressure information, force information, spark plug timing, crankshaft angle, camshaft angle, engine temperature, counter value, timer value, air mass flow, and/or exhaust emissions. In various embodiments, the block of engine sensors 64 will include an angle sensor 72 and a timer 74. As will be appreciated, in these and other various applications other types of system values may be monitored.

In various embodiments where the block of engine sensors 64 includes one or more angle sensors, each angle sensor 72 accurately measures one or more angles and provides angle information 73. For example, an angle sensor could detect a crankshaft angle or a camshaft angle. If an angle sensor 72 detects an angle, the engine control system 62 can generate one or more control signals based on the detected angle.

In various particular embodiments, an angle sensor 72 is a crankshaft angle sensor that measures an angle of the crankshaft 34. If present, the crankshaft angle sensor may include: a target wheel 76, one or more filters 78, a phase-locked-loop 80 (PLL), and an angle counter 82. The target wheel 76, which may be a crankshaft target wheel, is a disc-shaped device that is often coupled to a crankshaft 34 and which provides target wheel angle information 77 in the form of a regularly repeating signal. Typically, one or more filters 78 receives the target wheel angle information 77 from the crankshaft target wheel and generally provides a clean signal 79. The PLL 80 then receives the clean signal 79 and provides a format signal 81. The angle counter 82 then receives the format signal 81 and provides angle information that can be utilized by the dual capture peripheral 66, the microcontroller 68, and/or other system components.

Figure 4C:
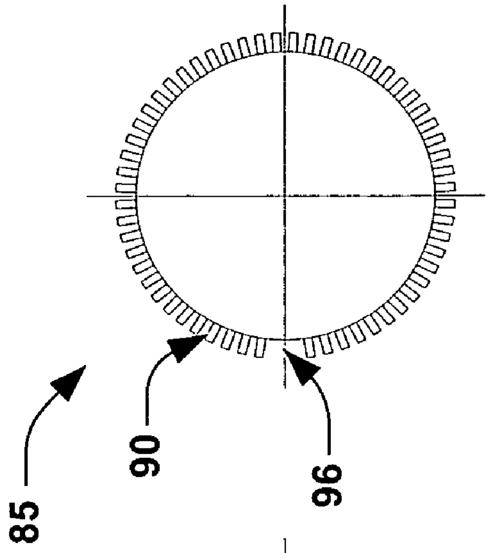
FIGS. 4*a*, 4*b*, and 4*c*, each illustrate one embodiment of a crankshaft target wheel.
Figure 4B:
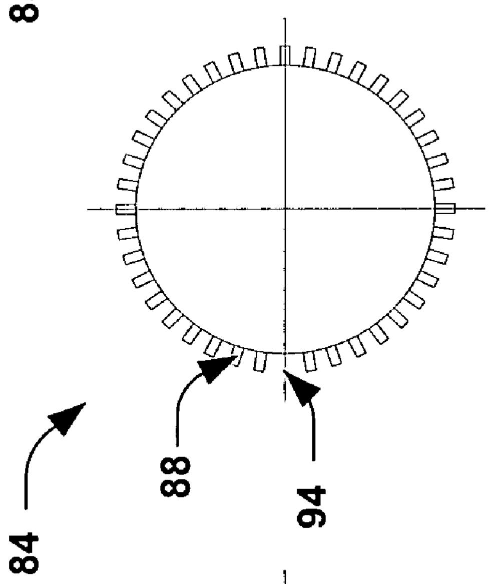
Figure 4A:
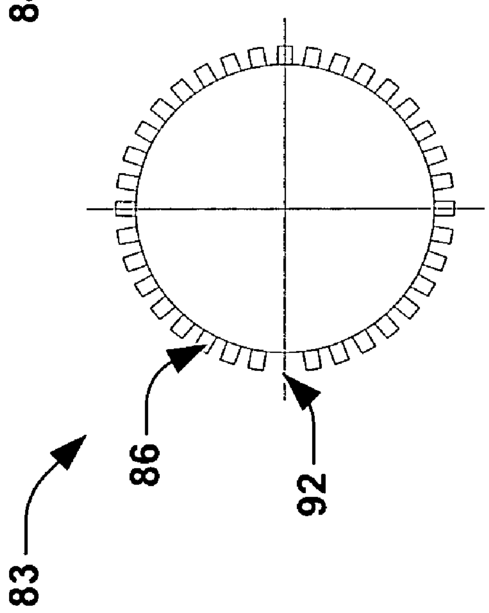

FIGS. 4*a*, 4*b*, and 4*c* show three particular embodiments for a crankshaft target wheel 83, 84, 85. In these and other various embodiments, the crankshaft angle sensor may be a Variable Reluctance Sensor ("VRS"), a Hall Effect sensor, or other type of sensor. Note that these illustrated target wheels in no way limit the scope of the invention.

Each of the illustrated embodiments in FIGS. 4*a*, 4*b*, and 4*c* shows a crankshaft target wheel 83, 84, 85 with a series of teeth 86, 88, 90 around its outer edge. Each of the crankshaft target wheels has a toothless region 92, 94, 96 where one or more teeth are missing. As a crankshaft target wheel rotates, its rotating teeth produce a regularly repeating signal by which the angle of the crankshaft can be determined. The toothless region allows the system to detect one full revolution of the wheel. Because various crankshaft target wheels have different numbers of teeth around their outer periphery, the various crankshaft target wheels will generate a regularly repeating signal at different frequencies. For example, in FIG. 4*a*'s illustrated embodiment, the crankshaft target wheel 83 has thirty-six theoretical teeth 86, with a toothless region 92 with one tooth missing. In FIG. 4*b*'s illustrated embodiment, the crankshaft target wheel 84 has forty theoretical teeth 88, with a toothless region 94 with one tooth missing. In FIG. 4*c*'s illustrated embodiment, the crankshaft target wheel 85 has sixty theoretical teeth 90, with a toothless region 96 with two teeth missing. Of course, these figures are merely illustrative and do not limit the scope of the invention; various embodiments may also use other crankshaft target wheels or no target wheels at all. In other control applications, different sensors may be employed to monitor any type of process or apparatus condition.

Referring again to FIG. 3's illustrated embodiment, an angle sensor 72 may also be a camshaft angle sensor that measures an angle of the camshaft 36. If present, the crankshaft angle sensor may include: a target wheel 76, one or more filters 78, a phase-locked-loop 80 (PLL), and an angle counter 82. The target wheel 76, which may be a camshaft target wheel, is a disc-shaped device that is often coupled to the camshaft 36 and which provides target wheel angle information 77 in the form of a regularly repeating signal. Typically, one or more filters 78 receives the target wheel angle information 77 from the camshaft target wheel and generally provides a clean signal 79. The PLL 80 then receives the clean signal 79 and provides a format signal 81. The angle counter 82 then receives the format signal 81 and provides angle information that can be utilized by the dual capture peripheral 66, the microcontroller 68, or other system components.

FIGS. 5*a*, 5*b*, 5*c*, and 5*d* show four particular embodiments for a camshaft target wheel 98, 100, 102, 104. In these and other various embodiments, the camshaft angle sensor may be a VRS, a Hall Effect sensor, or other type of sensor. Note that these illustrated target wheels in no way limit the scope of the invention.

Figure 5A:
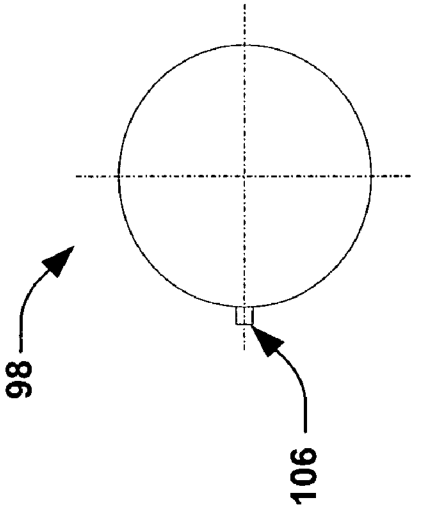
FIGS. 5*a*, 5*b*, 5*c* and 5*d*, each illustrate one embodiment of a camshaft target wheel.
Figure 5B:
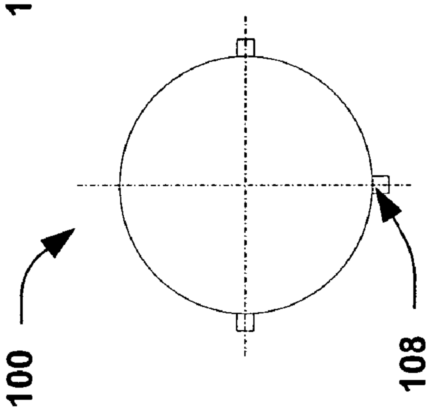
Figure 5C:
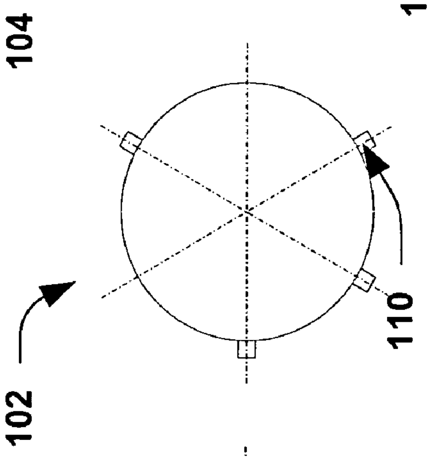
Figure 5D:
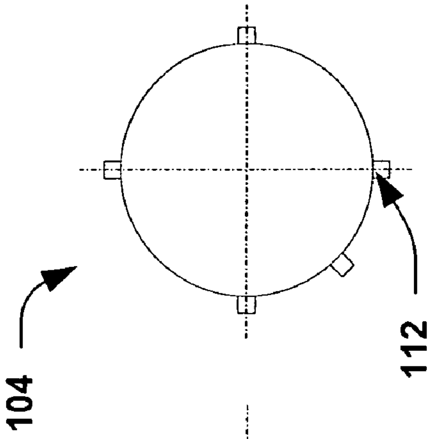

Each of the illustrated embodiments in FIG. 5*a*, 5*b*, 5*c*, and 5*d* shows a camshaft target wheel 98, 100, 102, 104 with one or more teeth 106, 108, 110, 112 around its outer edge. As the camshaft 36 rotates (typically at one half the rate of the crankshaft 34), the camshaft target wheel's rotating teeth produce a regularly repeating signal by which the angle of the camshaft can be determined. Because various camshaft target wheels have different numbers of teeth around their outer periphery, the various camshaft target wheels will generate a regularly repeating signal at different frequencies. For example, in FIG. 5*a*'s illustrated embodiment, the camshaft target wheel 98 has one tooth 106. In FIG. 5*b*'s illustrated embodiment, the camshaft target wheel 100 has three teeth 108. In FIG. 5*c*'s illustrated embodiment, the camshaft target wheel 102 has four teeth 110. In FIG. 5*d*'s illustrated embodiment, the camshaft target wheel 104 has five teeth 112. Of course, these figures are merely illustrative and do not limit the scope of the invention; various embodiments may also use other camshaft target wheels or no target wheels at all.

Referring again to the illustrated embodiment of FIG. 3, one can see that a dual capture peripheral 66 may be coupled to two or more sensors 70 in the block of engine sensors 64. Although the illustrated embodiment illustrates a dual capture peripheral 66 that is connected to an angle sensor 72 and a timer 74, it will be appreciated that any other sensor 70 could be coupled to the dual capture peripheral (in addition to, or in place of, one or both of the angle sensor 72 and timer 74). The dual capture peripheral provides an innovative and effective method to detect the monitored values, such as engine values. In one or more embodiments, the dual capture peripheral allows the engine control system 62 to accurately detect high angle resolution and provides low sensitivity to angle signal errors.

Figure 6:
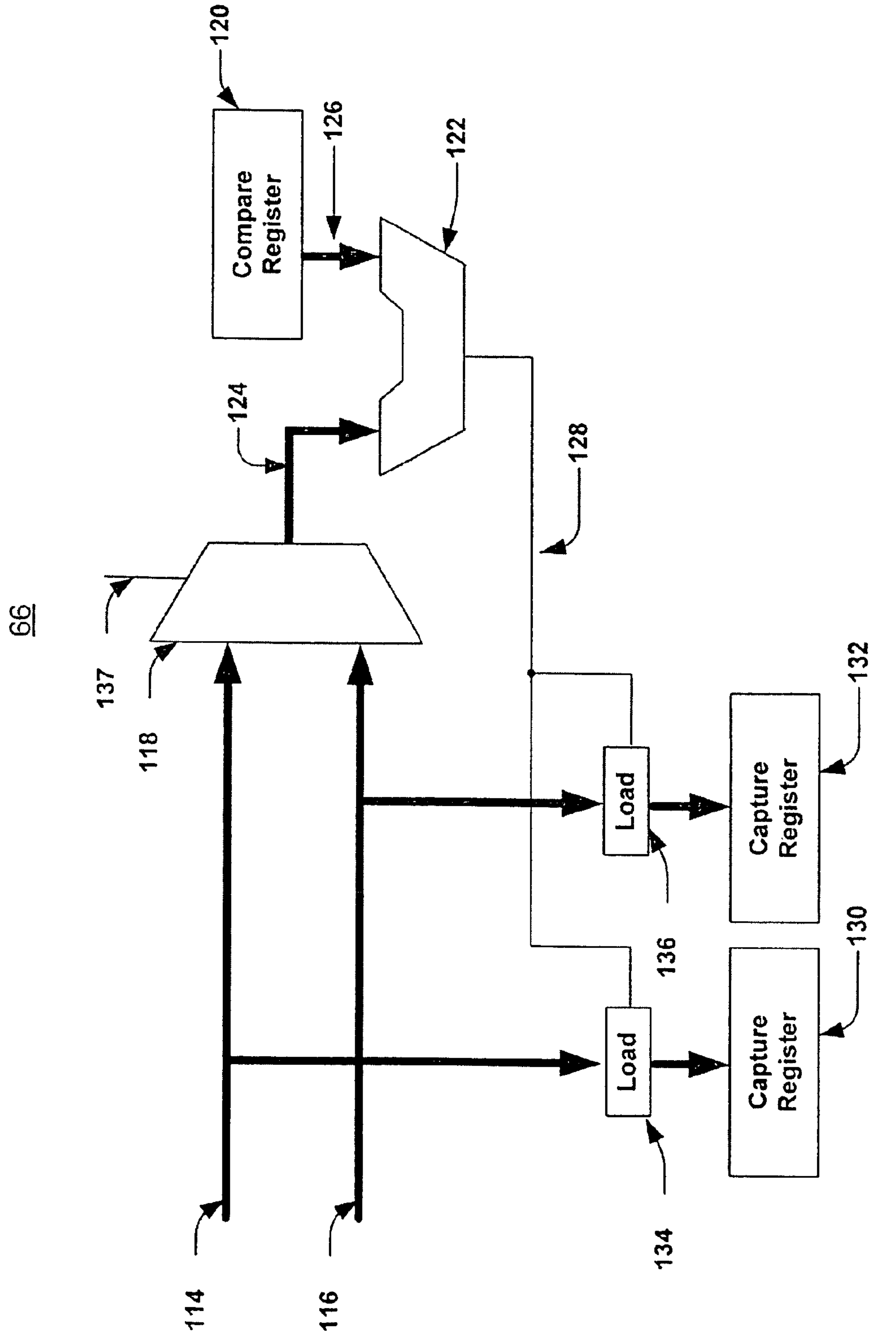
FIG. 6 illustrates one embodiment of a dual capture peripheral circuit.

Referring now to the illustrated embodiment in FIG. 6, one can see one embodiment of a dual capture peripheral 66. Although the dual capture peripheral 66 is illustrated as coupling to two buses 114 and 116, in other embodiments, dual capture peripheral 66 couples to one bus or to more than two buses. Each of the buses 114 and 116 illustrated in FIG. 6 transmits or provides one or more engine values. Multiplexer 118 is configured to select one of two or more engine values from buses 116 and 116 and a compare register 120 is configured to store a compare value. A comparator 122 compares the selected engine value 124 to the compare value 126 and generates an event signal 128 if the selected engine value 124 is logically related to the compare value 126. In various embodiments, logically related to refers to the selected engine value 124 being greater than, equal to, or less than the compare value 126. In other embodiments, engine value 124 can be logically related to compare value 126 in other ways. Dual capture peripheral 66 includes capture registers 130 and 132. The engine value from each engine bus is stored in a capture register when the event signal 128 is generated. As further shown in the illustrated embodiment, the dual capture peripheral 66 may also include loading gates 134 and 136. In various embodiments (not shown), the compare register 120 could be logically combined with one of the capture registers 130 or 132 to form a combined compare/capture register, with the compare/capture register holding the compare value prior to the event and the captured value after the event.

In one embodiment, the buses 114 and 116 provide a number of system values. If one of these system values is logically related to a compare value, then the event signal is generated and at least two of the system values are stored at a time that is related to the event signal. In addition, the compare value may then be altered, and a second event signal can be generated if another of the system values is logically related to the altered compare value. Again, at least two of the system values are stored at a second time that is related to the second event signal. For example, if the first compare value is relates to time, then the event signal may be generated if time information on one of the buses is logically related to the time compare value. If the compare value is then altered to relate to angle, then the second event signal can be generated if angle information on one of the buses is logically related to the angle compare value.

In the illustrated example, each of the buses 114 and 116 provides engine information that is related to one or more engine values. In one example, the engine information on each of these two buses continuously changes (e.g., it may relate to a counter that continuously updates, or it may relate to an angle that is continually changing.)

In various embodiments, one of the buses 114 and 116 provides timing information. In these embodiments, the dual capture peripheral may capture timing information on a single capture event. In particular embodiments, this timing information is provided by a timer 74.

In various embodiments, one of the buses 114 and 116 provides angle information. In these embodiments, the dual capture peripheral may capture angle information on a single capture event. In various embodiments, this angle information is provided by an angle sensor 70. In particular embodiments, the angle information is provided by a crankshaft angle sensor and/or a camshaft angle sensor.

In various embodiments, one of the buses 114 and 116 provides angle information and another one of the buses 114 and 116 provides timing information, or one of either bus 114 or bus 116 provides both angle information and timing information. In these embodiments, the dual capture peripheral may capture both angle information and timing information on a single capture event. In particular embodiments, the timing information is provided by a timer 74 and the angle information is provided by a crankshaft angle sensor and/or a camshaft angle sensor.

In the embodiment illustrated in FIG. 6, multiplexer 118 is coupled to each of the buses 114 and 116. Based on the multiplexer control signal 137, the multiplexer 118 will select one of the buses 114 and 116. The multiplexer 118 may then pass the engine value associated with the selected bus to the multiplexer output 124. As discussed below, the multiplexer control signal 137 is typically related to the compare value in the compare register 120. In typical embodiments, the multiplexer control signal will change in time. For example, a user may want to periodically compare time and periodically compare angle. In such embodiments, the multiplexer control signal 137 may toggle back and forth to select a bus related to timing information and then to select a bus related to angle information, respectively.

In the embodiment illustrated in FIG. 6, compare register 120 is configured to store a compare value. Generally, the compare value in this example relates to an engine value. In various particular embodiments, the compare value relates to a time value. In various particular embodiments, the compare value relates to an angle value. In typical embodiments, the compare value will change in time. For example, the compare value in the compare register 120 may correspond to the multiplexer control signal.

For example, in various embodiments, if the compare value relates to a time value at a given time, then the multiplexer 118 selects timing information at that time. In various embodiments, if the compare value relates to an angle value at a given time, then the multiplexer 118 selects angle information at that time. Similarly, if the compare value relates to some other engine value at a given time, the multiplexer 118 selects appropriate engine information at that time.

In the illustrated embodiment, comparator 122 compares the selected engine output 124 (e.g., multiplexer output) to the compare value 126, and typically generates an event signal 128 when the selected engine value 124 is logically related to the compare value 126. Logically related to includes, but is not limited to, the engine value 124 being greater than, equal to, or less than the compare value 126. The event signal 128 causes the engine values on each of the two data buses to be stored in capture registers 130 and 132. For example, in a particular embodiment where one of two buses relates to angle information and the other of two buses relates to time information, the comparator 122 may be configured to detect whether the value of the selected bus is greater than or equal to the compare value in the compare register. In typical embodiments, the engine values on each of the two data buses are stored in capture registers 130 and 132 on a single clock cycle, or in some other suitable number of clock cycles that is advantageous for whatever reason.

As further shown in FIG. 6's illustrated embodiment, the dual capture peripheral may also include loading gates 134, 136 for loading each capture register. Each loading gate 134, 136 may be coupled to one of the buses 114 and 116, and each loading gate may also be coupled to a respective capture register. In various embodiments, the loading gates 114, 116 may not be present or may be integrated within other aspects of the dual capture peripheral.

Figure 7:
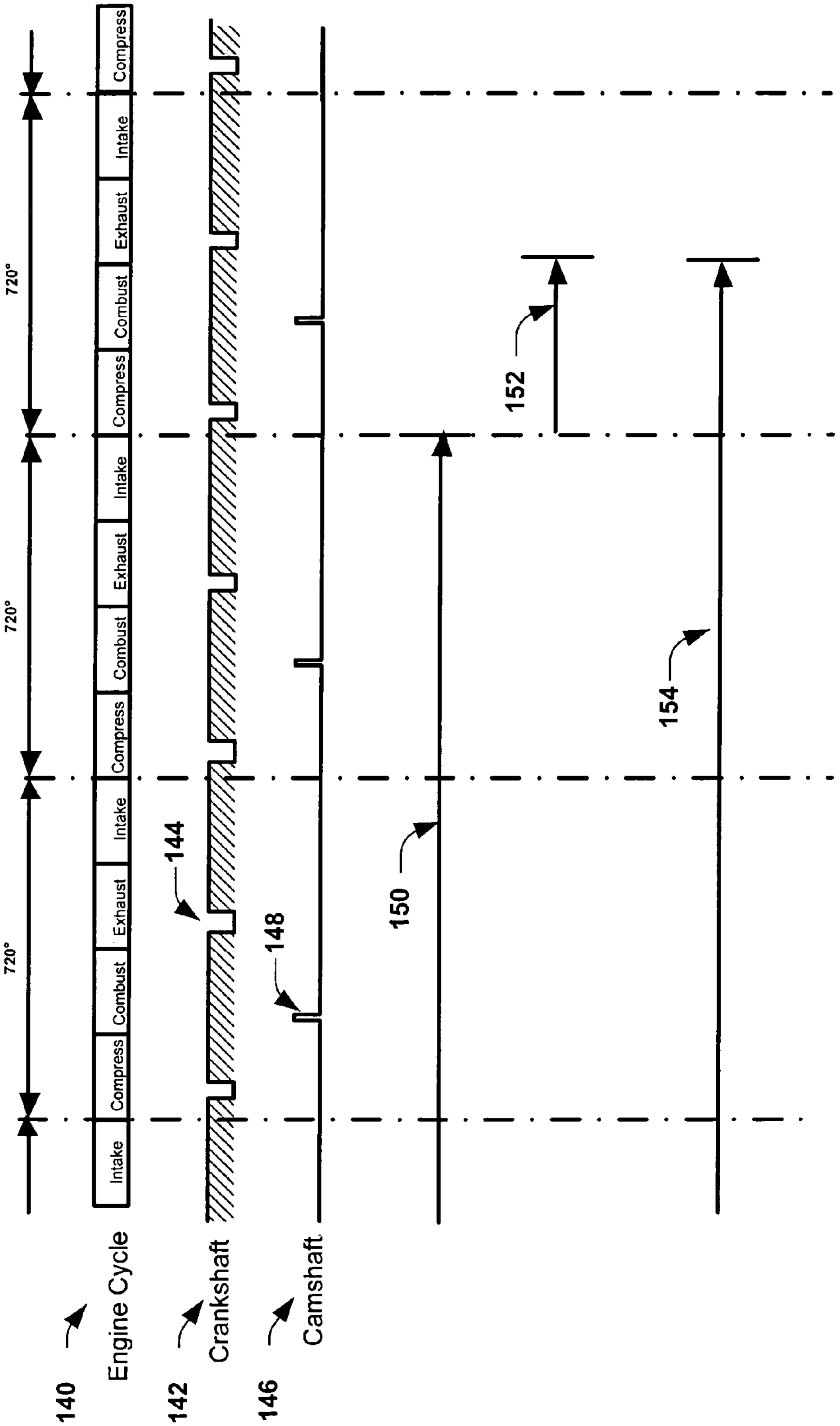
FIG. 7 illustrates one embodiment of a timing diagram.

Referring now to FIG. 7, one can see a timing diagram according to one example that illustrates how a particular embodiment may combine various of the above discussed features to implement a control system for implementing four strokes of a four-stroke engine cycle 140. As shown in FIG. 7, a regularly repeating crankshaft-target wheel signal 142 can have an operation period of 720°. The crankshaft-target wheel signal 142 can include inactive regions 144 that correspond to the toothless region of the crankshaft target wheel (see e.g., FIGS. 4*a*, 4*b*, and 4*c*.)

Still referring to FIG. 7, in one embodiment, the angle counter 82 (see FIG. 3) provides 24-bit angle information having two components: an integral period component 150 and an offset angle component 152. The integral period component 150 represents the integral number of full-720° periods that have passed. The offset angle component 152 represents the angle reference within a single 720° period.

In various embodiments, an angle event 154 is associated with the integral period component 150 and/or the offset angle component 152. By utilizing the dual capture peripheral, the microcontroller can, in a single compare event, read both time information at which an angle event 154 occurred and angle information at which the angle event occurred. On a subsequent single compare event, the microcontroller can, for example, read both time information at which a time event occurred and angle information at which the time event occurred. In other embodiments, the microcontroller can read other suitable information.

Figure 8:
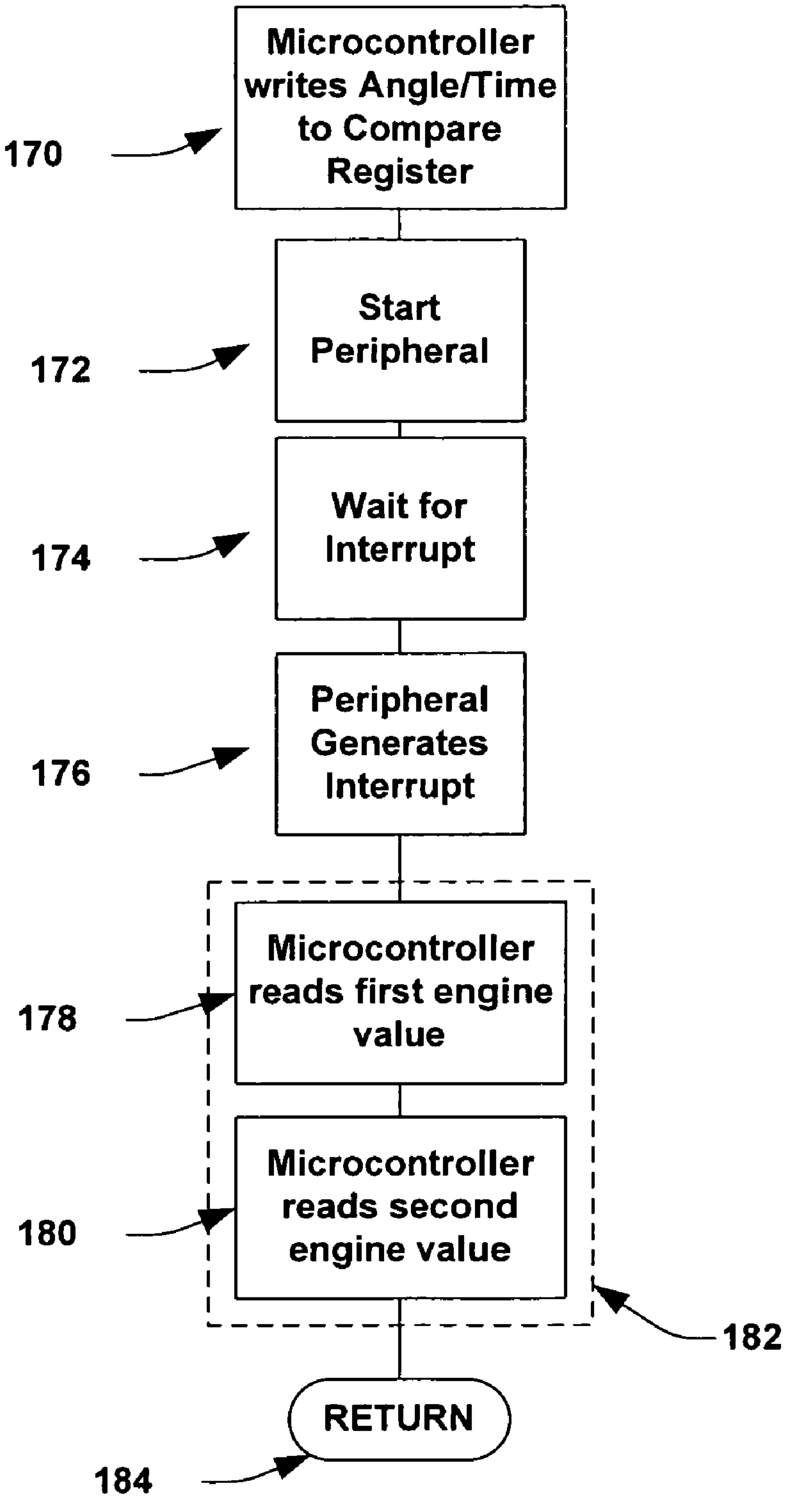
FIG. 8 is one embodiment of a flow chart illustrating a control method.

Referring now to FIG. 8, a flowchart is provided illustrating aspects of the present invention. Furthermore, the methods of the present invention may be implemented in association with various types of monitoring components and systems, and any such system or group of components, either hardware and/or software, incorporating such a method is contemplated as falling within the scope of the present invention. Generally, FIG. 8 illustrates one method utilized by a control system, for example an engine control system. In block 170, the microcontroller 68 writes an engine value to compare register 120. In block 172, the dual capture peripheral is started. In various embodiments, the dual capture peripheral may be started, for example, by writing to a control register or by writing to the compare register 120. In block 174, the microcontroller waits for the dual capture peripheral to generate an interrupt. In block 176, the dual capture peripheral generates an interrupt. In one or more operating modes, the dual capture peripheral generates an interrupt at a time related to the event signal 128. In one or more operating modes, the dual capture peripheral generates an interrupt at a time related to the angle event 154. Next, the microcontroller 68 reads a first engine value from the dual capture peripheral at 178 and the microcontroller reads a second engine value from the dual capture peripheral at 180. In various embodiments, these reads at 178 or 180 may occur in a single interrupt service routine 182. After the interrupt service routine 182 completes, the microcontroller may return to its main routine or other sundry tasks 184.

Although the invention has been shown and described with respect to a certain aspect or various aspects, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. An engine control system, comprising: at least two engine sensors configured to provide data along at least two respective data paths;

a selection element coupled to the at least two data paths, the selection element adapted to select data from one of the at least two data paths based on a control signal and provide the selected data on a first circuit path;

comparator circuitry coupled to the first circuit path, the comparator circuitry adapted to compare the selected data to a compare value and selectively generate an event signal on a second circuit path in response to the comparison; and at least two memory elements respectively coupled to the at least two data paths and adapted to store data from the at least two data paths based on the event signal.

2. The engine control system of claim 1, further comprising:

a microcontroller configured to read the at least two memory elements and provide engine control signals based on the data in the at least two memory elements.

3. The engine control system of claim 1, wherein a first engine sensor of the at least two engine sensors provides angle information and a second engine sensor of the at least two engine sensors provides timing information.

4. An engine control system, comprising:

a first engine sensor configured to provide data along a first data path;

a second engine sensor configured to provide data along a second data path;

a selection element coupled to the first and second data paths, the selection element adapted to select data from the first data path or second data path based on a control signal and provide the selected data on a first circuit path;

comparator circuitry coupled to the first circuit path, the comparator adapted to compare the selected data to a compare value and selectively generate an event signal on a second circuit path in response to the comparison;

a first capture memory element coupled to the first data path and the second circuit path, where the first capture memory element is adapted to store data from the first data path based on the event signal; and a second capture memory element coupled to the second data path and the second circuit path, where the second capture memory element is adapted to store data from the second data path based on the event signal.

* * * * *